July 23, 1957    H. VOLLMER    2,800,039
MACHINES FOR SWAGING SAW TEETH AND THE LIKE
Filed Oct. 21, 1952    6 Sheets-Sheet 1
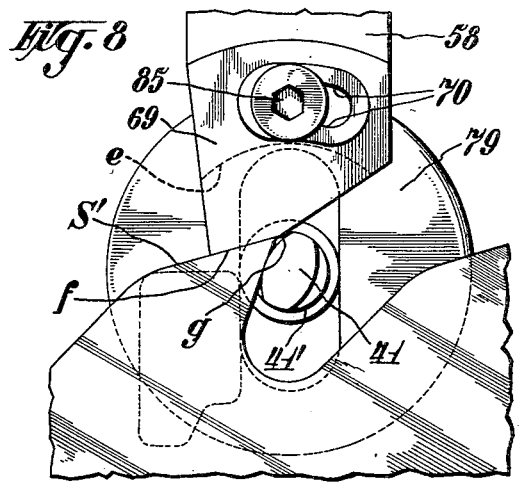
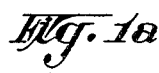 
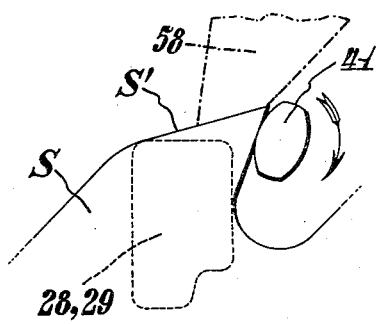 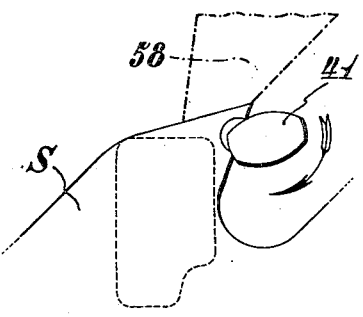
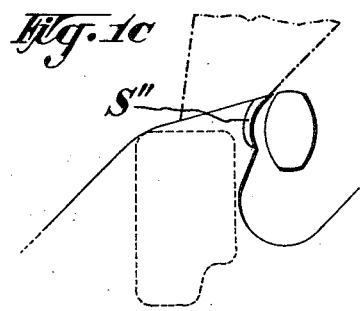
Inventor:
Heinrich VOLLMER
By
Attorney

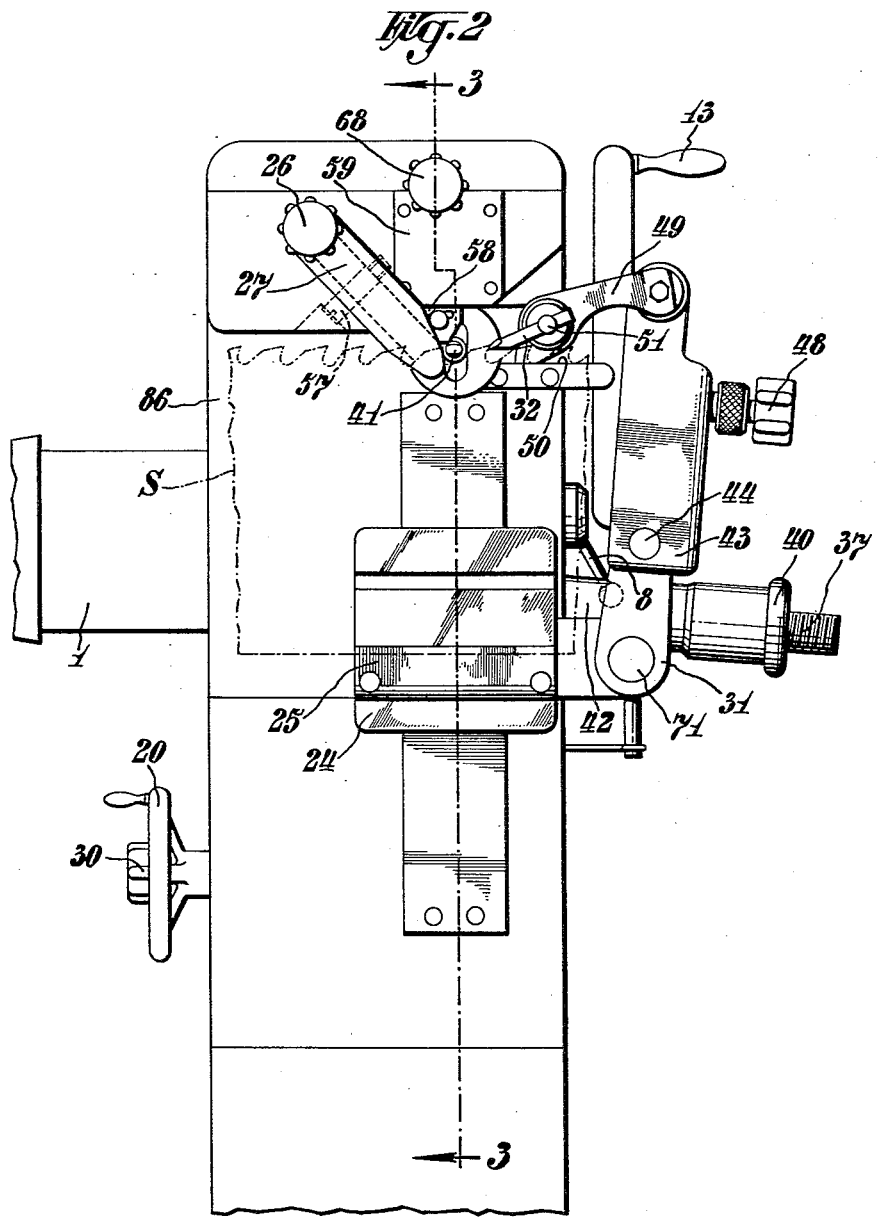

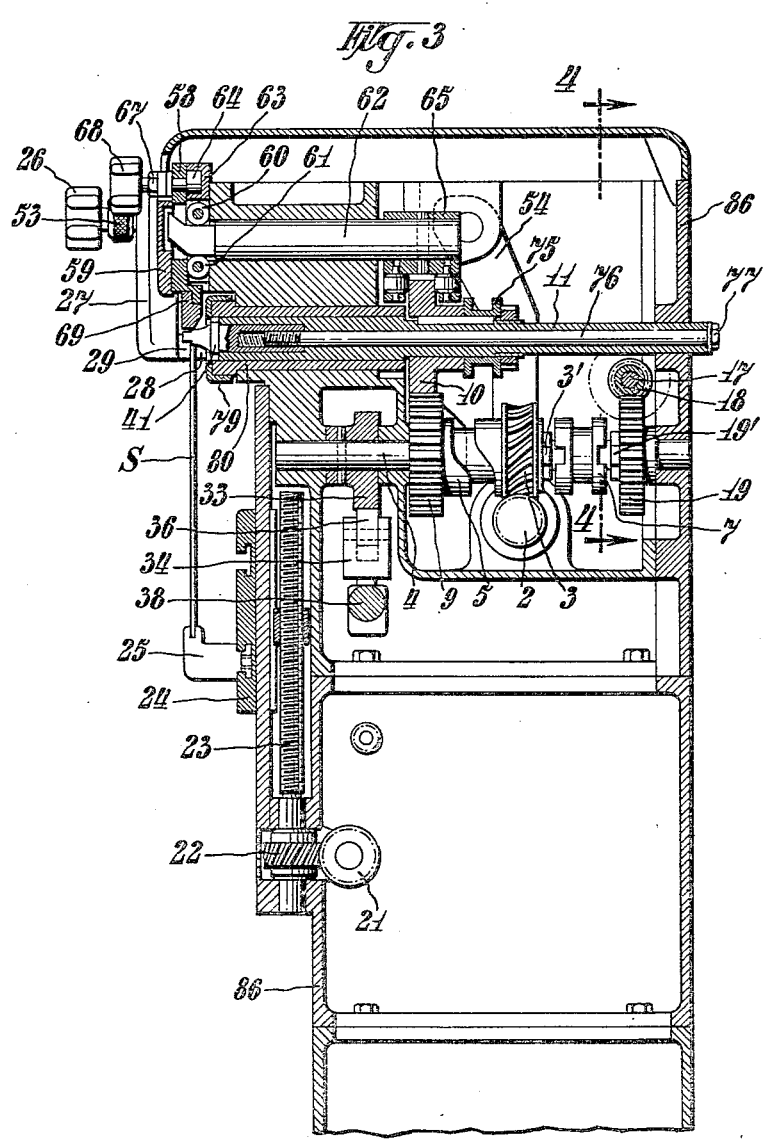

July 23, 1957 H. VOLLMER 2,800,039
MACHINES FOR SWAGING SAW TEETH AND THE LIKE
Filed Oct. 21, 1952 6 Sheets-Sheet 4
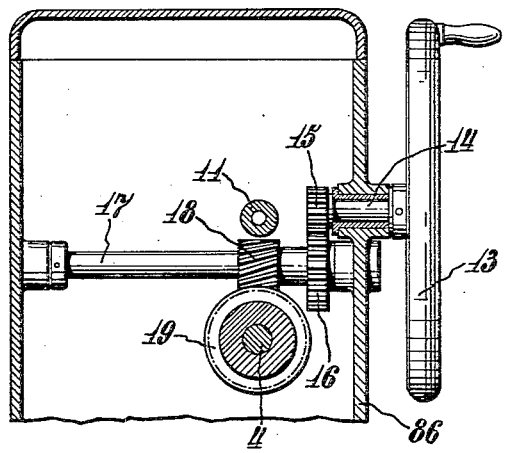
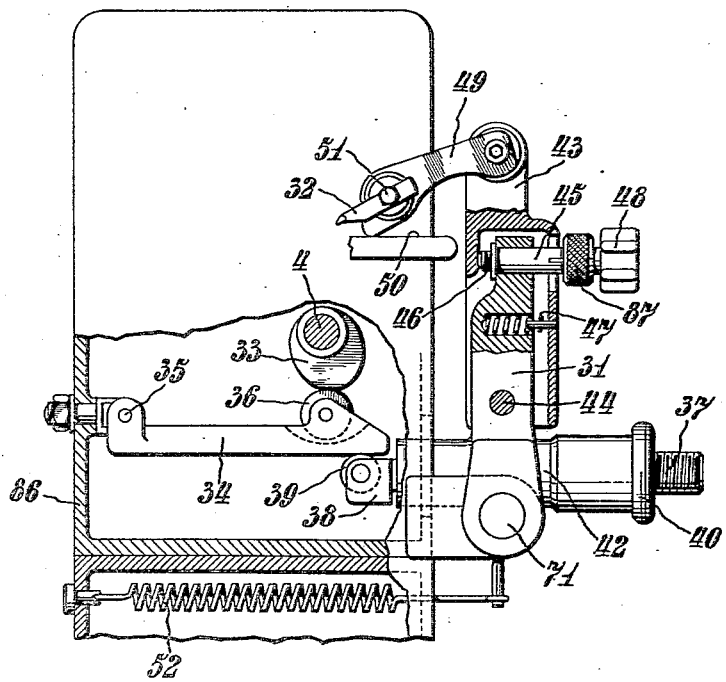
Inventor:
Heinrich VOLLMER
By Gustav H. Ewer
Attorney

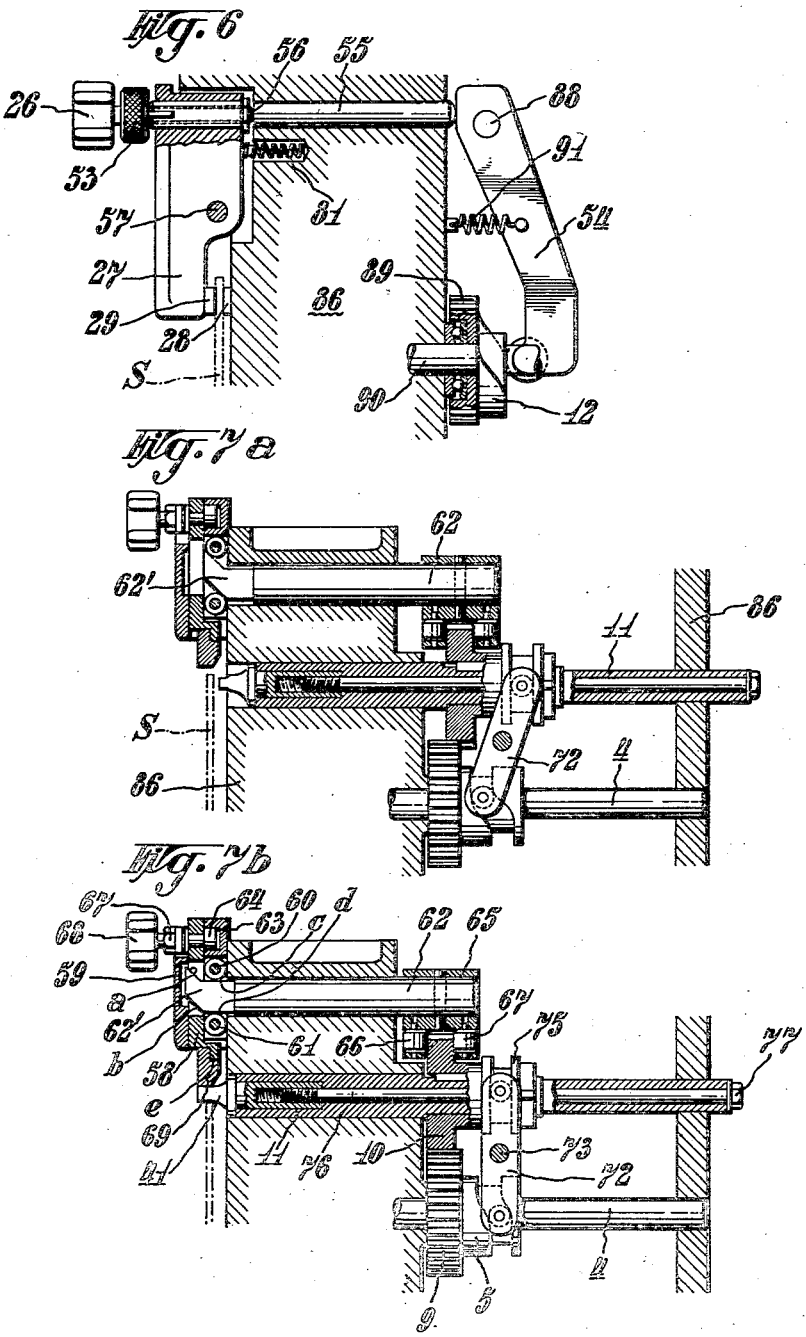

July 23, 1957 H. VOLLMER 2,800,039
MACHINES FOR SWAGING SAW TEETH AND THE LIKE
Filed Oct. 21, 1952 6 Sheets-Sheet 6
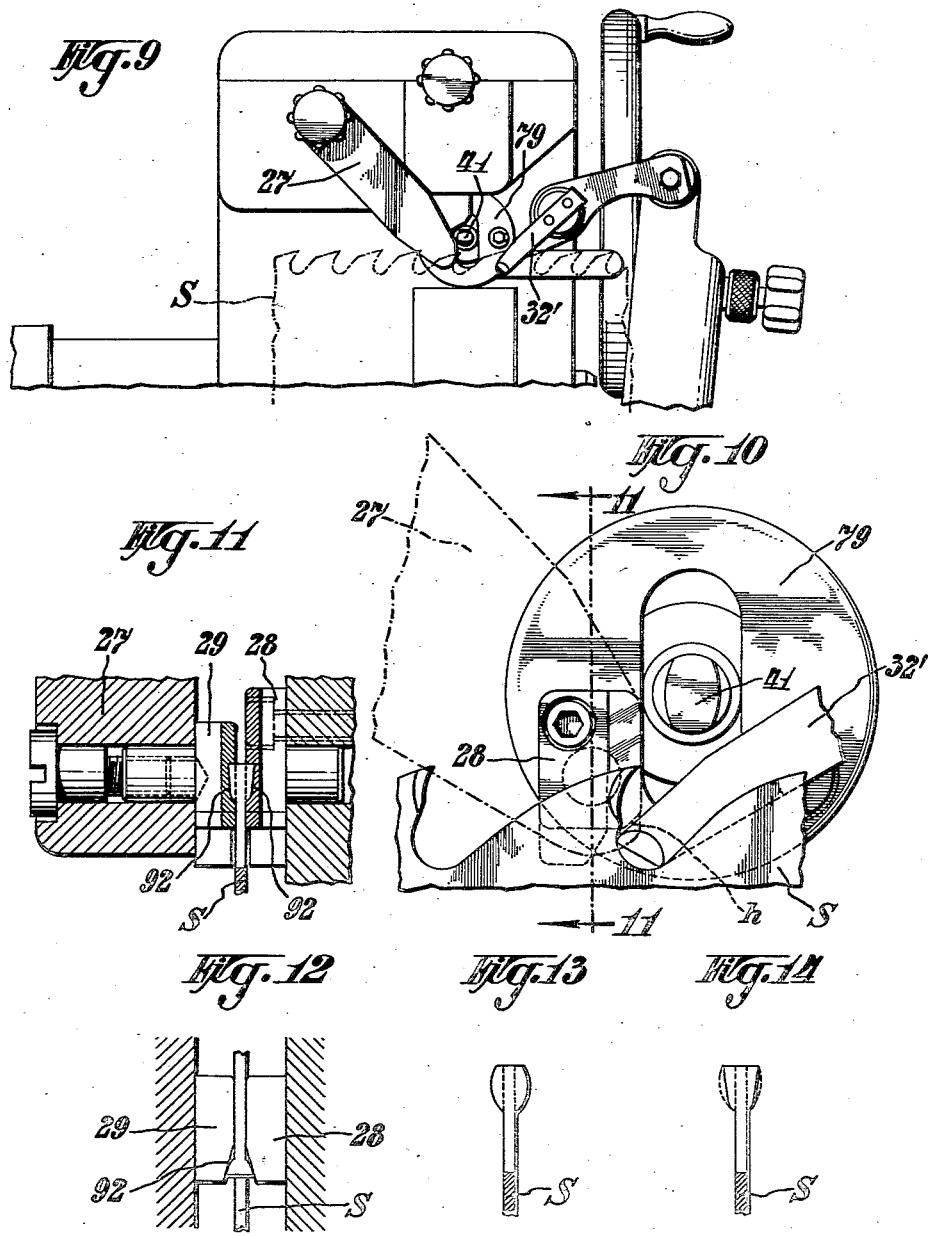
Inventor:
Heinrich VOLLMER
By Gustav H. ...
Attorney

United States Patent Office 2,800,039
Patented July 23, 1957

2,800,039

MACHINES FOR SWAGING SAW TEETH AND THE LIKE

Heinrich Vollmer, Biberach (Riss), Germany

Application October 21, 1952, Serial No. 315,972

Claims priority, application Germany October 24, 1951

6 Claims. (Cl. 76—54)

This invention relates to a machine for swaging saw teeth and the like.

To swage or up-set the teeth of a saw blade, operating devices which can be mounted on the saw blade are generally used which have a small capacity and require a certain amount of skill of the operator for their use. Also several swaging machines are known but these are not satisfactory as regards facility for supervising the operation, easy adjustability, uniformity of the swaging operation, and adaptability to various types of saws and shapes of saw teeth.

The present invention has for its object to provide a saw tooth swaging machine which will satisfy all requirements to a high degree and which can be used in quite general conditions for the purpose mentioned. Not only does the machine of the present invention guarantee uniform up-setting of the teeth but its work can be easily supervised and the machine has great facility of adjustment and adaptability for use on all kinds of saw blades, for example, for cross-cut saws, band saws, rip saws, circular saws, etc. Saw blades up to a thickness of 2.5 mm. can be worked, the tooth pitch of the blades may range from 15 to 90 mm., and the rate of operation amounts to at least 40 teeth per minute.

The saw tooth swaging machine of the present invention has for its object to provide shoes between which the saw tooth to be treated is firmly clamped, an anvil bearing against the tooth back up to the tooth point, and a rotary swaging tool of eccentric cross section which can be projected into and withdrawn from the tooth gap. Preferably the swaging tool rotates continuously and effects two up-setting steps during each rotation. However, if desired, an intermittently rotating swaging tool may be used.

According to a further feature of the invention the tooth point and the edge of the anvil coinciding therewith lie upon the major circle described by the swaging tool. As a result of this construction the swaging has the correct formation, and no material of the saw tooth can yield in an undesired manner during the treatment.

Further features of the invention are directed to special forms and arrangements of the swaging tool and other machine parts, particularly the drive mechanism. In this connection it should be noted that the swaging machine can also be used for equalizing the treated saw teeth, for which purpose the clamp shoes used during the swaging operation are also adapted to operate as equalizing shoes on the teeth. The equalization is effected in a second operation on the saw blade without requiring any exchange of tools, but merely a different location of the saw blade.

The accompanying drawings illustrate by way of example an embodiment of the saw blade swaging and equalizing machine, in which—

Figures 1a–1c are diagrammatic views on a large scale showing the principle of operation of the swaging tool, Figure 2 is a front elevation of the machine, Figure 3 is a sectional view taken at line 3—3 of Figure 2 in the direction of the arrows, Figure 4 is a sectional view taken on line 4—4 of Figure 3, showing the operation of the machine by hand drive, Figure 5 is a front elevation and partial section of the feed mechanism for the saw blade, other machine parts being omitted for sake of simplicity, Figure 6 is a sectional view showing the saw blade clamping device separately, Figures 7a and 7b are sectional views showing the drive members for actuating the swaging tool and the anvil in two different positions, Figure 8 is a diagrammatic view showing a part of Figure 2 on a larger scale, including the parts adjacent the swaging tool, Figure 9 is an elevation of a detail, showing the saw blade in equalizing position, Figure 10 is a diagrammatic view of a part of Figure 9 on a larger scale showing the clamp lever and the clamping and equalizing shoes in chain-dotted lines, Figure 11 is a section taken on line 11—11 of Figure 10, Figure 12 is a top view of the saw blade and the equalizing shoe according to Figure 11, and Figures 13 and 14 are front views showing a single saw tooth in up-set and equalized condition.

Basic operation of the machine and basic arrangement of the tools

The operation of the swaging machine is shown in Figs. 1a, 1b, and 1c. The tooth S of a saw blade to be swaged is rigidly held between clamp shoes 28, 29 and an anvil 58 which bears against the back S' of the saw tooth and extends to its point. Into the tooth gap extends a swaging tool 41 rotatable in the direction of the arrow and of eccentric cross-section. Fig. 1a shows the initial position, Fig. 1b shows the tool in the swaging operation, and Fig. 1c shows the position at completion of the operation. The whole swaging operation is effected in a half rotation of the tool 41.

The anvil is guided in the machine for up and down movement. To enable it to adjust itself to the inclination of the tooth back S' it is connected as shown in Fig. 8 to a head 69 which can be adjusted and fixed. The anvil 58 and the head 69 are shown contacting a cylindrical surface e or a plurality of such surfaces which may extend concentrically to the swaging tool or the axis thereof. The head 69 is connectable to the anvil by means of a screw 85 which extends through an arcuate slot 70 in the head 69. The anvil head 69 is so adjusted that its lower surface f (Fig. 3) coincides with the tooth back S'. The saw is shifted in longitudinal direction in such a manner that the edge g (Fig. 8) of the anvil head coincides with the tooth point. It will be seen also from this figure that the edge g lies on the major circle described by the setting tool, designated 41'.

The following operations are required to prepare the machine for work:

1. Clamping the saw blade in the clamping and holding device, and adjusting the saw blade for height.
2. Adjusting the feed.
3. Adjusting the saw blade clamping.
4. Adjusting the anvil.

The following operational steps take place in the working of the machine:

1. Closing the saw blade clamping device.
2. Supporting the saw tooth back by the anvil.
3. Moving the swaging tool into the tooth gap.
4. Swaging the saw tooth by rotation of the tool.
5. Opening the blade clamping device.
6. Moving the anvil up to position of rest.
7. Withdrawing the swaging tool from the tooth gap.
8. Feed of the saw blade.

Machine drive

The machine illustrated is adapted for power or hand drive. The machine frame 86 carries an electric drive motor 1 (Fig. 2) the shaft 2 of which is connected by means of a worm to a worm wheel 3 which is loose on a main shaft 4 journalled in the machine frame. The worm wheel 3 has coupling claws 3' co-operating with a coupling muff 7 slidable but not rotatable with respect to the shaft 4. The coupling muff is slidable by means of a hand lever 8 from a mid-position shown in Fig. 3, to the left to produce positive coupling of the drive motor to the main shaft 4. When the coupling muff 7 is shifted to the right, Fig. 3, it comes into engagement with coupling claws 19' on a helical gear 19 of a hand drive, as shown in Fig. 4. A shaft 14 journalled in the frame 86 carries externally a hand wheel 13 and internally of the frame a spur pinion 15 engaging a spur wheel 16 on an intermediate shaft 17. A helical gear 18 on the shaft 17 engages the helical gear 19 on the main shaft 4. These gears provide a double reduction drive which makes it possible to exert sufficient force by the hand drive.

The main shaft 4, operable selectively by hand or power, effects movement and control of all the other machine parts.

Saw blade holding device

To hold and guide the saw blade, shown in the drawings as a band saw S, there is mounted on the outside of the machine frame a slide 24 movable in vertical direction and having horizontally extending grooves engaging a holder plate 25 for the backs of the saw teeth. The slide 24, Fig. 3, can be adjusted for height by turning a hand wheel 20, see Fig. 2. On the shaft of the hand wheel 20 there is fixed a helical gear 21 engaging a helical gear 22 on a vertical screw spindle. The slide 24 has a nut engaging the screw spindle 23, so that by turning the hand wheel 20 the holder plate 25 can be brought to a suitable level to enable the saw blade S to be mounted. Thereupon the slide 24 along with the holder plate 25 are raised until the teeth of the saw blade engage between the clamp shoes 28, 29 of the blade clamping device hereinafter described. The hand wheel 20 can be secured in the desired position by means of a lock nut 30.

Feed mechanism

The feed mechanism is shown best in Figs. 2 and 5. The intermittent feed of the saw blade S is effected by means of a cam 33 on the main shaft 4 co-operating with an intermediate lever 34 and the feed lever 31 which can rock about a pivot 71 in the machine frame. A tension spring is connected between the lower end of the feed lever 31 and the machine frame operates to restore the feed lever. The intermediate lever 31 is pivoted on a pin 35 in the machine frame 86 and for its cooperation with the cam 33 it carries a roller 36. The power transmission from the intermediate lever 34 to the feed lever 31 is effected by means of a screw spindle 37 slidable in a bearing 42 of the feed lever 31. The movement of the spindle 37 is effected by a manually rotatable sleeve 40 thereon. The screw spindle 37 has a square head 38 carrying a roller 39 cooperating with the lower phase of the intermediate lever 34. When the roller 36 as shown in Fig. 5 is at the highest point of the feed cam 33, then the intermediate lever and its lower slide part, and the screw spindle 37 are parallel to each other. Consequently, the forward end-position of the feed remains constant. When, by turning the adjusting sleeve 40 the screw spindle 37 with its roller 39 are moved to the left, Fig. 5, then only the feed path is reduced while the forward end-point of the feed remains the same. By adjustment of the screw spindle 37 the length of feed is adapted to the tooth pitch of the saw blade. This adjustment can take place while the machine is in operation.

As shown in Fig. 5, the feed lever is in two parts. The lever 31 is rotatably connected by a pin 44 with a second lever 43, the lower part of which is hollow and the upper part of which receives the lever 31. The position of the levers 31, 43 relative to each other is determined by a screw 46 arranged in a screw threaded sleeve 45 inserted in the lever 31. The screw 46 has at its outer end an actuating knob 48 and it can be fixed in adjusted position by a lock nut 87. A compression spring 47 is arranged between the two levers 31, 43 to insure that the lever 31 is permanently supported by the end of the screw 46 in the lever 43. This two-part formation of the said lever 31, 43 with adjusting screw 46 serves for exact location of the tooth surface to be treated by the swaging tool 41. To the upper end of the feed lever 43 there is jointedly connected a feed pawl 32 on an arm 49, which pawl is held in position on the arm 49 by means of a screw connection 51. The pawl arm 49 slides on a fixed horizontal track 50 whereby the level of the feed pawl 32 is mounted constant. The feed pawl 32 engages to feed the saw blade, in the upper third of the tooth height.

Saw blade clamping mechanism

This mechanism is seen best in Figs. 2, 3 and 6. The clamp shoe 28 is fixed in position on the machine frame 86 and is opposed by a clamp shoe 29 attached to the clamp lever 27 which can rock about a fixed pin 57. A compression spring bearing against the machine frame 86 presses upon the upper end of the clamp lever 37 so that the two clamp shoes are constantly urged together to guide the saw blade S during feeding. An adjusting means in the form of a screw 56 is mounted in the upper part of the clamp lever 27, which adjusting screw can be turned by means of a hand wheel 26 thereon and fixed in adjusted position by a lock nut 53. The end of the adjusting screw 26 cooperates with a pressure bolt 55 slidably mounted in the machine frame and against the other end of this bolt and contacts a pressure lever 54 rotatable about a pivot 88 in the machine frame. The operation of the pressure lever 54 is effected by engagement of a roller thereon with a rotary cam 12 fastened on a gear 89 or integral therewith. The gear 89 is carried by a shaft 90 supported by means of a pressure bearing in a part of the machine frame and said gear constantly engages a gear wheel 9 fast on the main shaft 4. A helical tension spring 91 engaging the pressure lever 54 produces contact between this lever and the operating cam 12. The movable clamp shoe 29 can be adapted to the thickness of the saw blade being treated, by turning the screw bolt 56, which bolt also regulates the clamping pressure. From Fig. 6 it can be seen that the pressure lever 54 multiplies the force exerted thereon, so that the blade clamping is effected under very high pressure, which is necessary since the clamped and tensioned saw tooth must not be allowed to yield under the pressure exerted thereon by the swaging tool.

Drive of the swaging tool and of the toothed back supporting anvil

The drive of the swaging tool and the control of the anvil is effected by means of a gear wheel 9 fast on the main shaft which gear 9 has fixed thereon a cam 5, these parts being shown in 7a and 7b. The set tool shaft 11 is rotatably and slidably mounted in the machine frame and carries at its front end, in floating arrangement, an exchangeable swaging tool 41. The attachment of the tool 41 is effected by means of a screw 76 journaled in a bore in the tool shaft 11, which screw is rotatable by means of a head 77 at the rear end of the tool shaft. In Fig. 3 it will be seen that the tool shaft 11 is journaled in a bushing 80 on the front of which a cap-shaped cover 79 is mounted.

A gear 10 fast on the tool shaft 11 is in permanent mesh with the gear 9 on the main shaft 4, so that the tool shaft is continuously rotated. The hub of the gear 10 has collars 75 between which engages by means of rollers a link 62 rotatable about a fixed pivot 73. At its lower end the link 72 has rollers which engage the cam 5 so that the rotation of the tool shaft 11 is accompanied by axial movement thereof.

The axial movement of the tool shaft 11 effects the operation of the previously mentioned anvil parts 58, 69. In the present embodiment the anvil 58 is movable in a vertical direction and is adjustably connected to a slide 63. The parts 58, 63 are guided in a groove or vertical guide in the machine frame, the front of which is covered by a fixed cover plate 59. The anvil 58 has at its upper part a spindle rotatable by means of a hand wheel 68 and which has an eccentric 64 engaging recess in the slide 63. By rotation of the hand wheel 68 the anvil can be adjusted as to elevation and fixed in position of adjustment by a lock nut 67. Figures 7a and 7b also illustrate the supporting of the anvil head 69 by at least one cylindrical surface e already mentioned in connection with Fig. 8.

The operation, that is the up-and-down movement of the anvil, is effected by means of a shaft 62 journaled in the machine frame and extending parallel to the tool shaft 11, which shaft has a square head 62' engaging corresponding openings in the anvil 58 and the slide 63. The upwardly angled head 62' presses on the top and bottom parallel oblique control surfaces a and b. These oblique surfaces a and b are continued into horizontal control surfaces c and d, see Fig. 7b. The control surfaces a, b, c, d cooperate in the slide 63 with the rollers 60, 61 journaled on horizontal pivots. Fig. 7a shows the anvil in its upper position in which the rollers 60, 61 are in contact with the oblique surfaces a, b. Fig. 7 shows the anvil in its lower or working position in which the roller 61 bears on the lower horizontal surface d of the head 62'. By this arrangement the pressure exerted by the swaging tool is not capable of producing an axial shift of the shaft 62. Owing to the engagement of the square head 62' in the parts 58, 63 turning of the shaft 62 is prevented.

The shaft 62 is coupled in any suitable manner with the tool shaft 11 so that the shaft 62 participates in the actual shifting of the tool shaft 11. To dispense with the coupling members the gear wheel 10 on the tool shaft 11 is used as a coupling member. The gear 10 engages a fork 65 fixed on the shaft 62. On the limbs of the fork rollers 66, 67 are mounted on horizontal axes, which rollers contact laterally the faces of the gear 10.

Operation of the machine

The saw blade S to be treated is supported on the holder plate 25 and is entered between the clamp shoes 28, 29 from below, which shoes are opened for this purpose by the adjusting screw 26, 56. By turning back the adjusting screw 56 the movable clamp shoe 29 is located in accordance with the thickness of the saw blade. The anvil 58 is brought to the correct level by turning the eccentric wheel 68 and the anvil head 69 is adjusted corresponding to the slope of the saw tooth back S', as shown in Fig. 8. The feed of the pawl 32 is then set to correspond with the tooth pitch of the saw blade S whereupon the upsetting operation can be commenced and carried out either using the electric motor 1 or the hand drive. The hand drive facilitates the making of the various adjustments.

When the swaging tool 41 is withdrawn the saw blade is fed by one tooth whereupon the cam 12 operates the clamp lever 27 to insure positive clamping of the saw tooth between the clamp shoes 28, 29. When the tool 41 advances into the tooth gap, the shaft 62 effects downward movement of the anvil 58, 59 and consequently support of the clamped saw tooth along its back. The supporting movement of the anvil is completed before the continuously rotating swaging tool has come into contact with the face of the saw tooth. The upsetting or swaging operation now begins as shown in 1a–1c. Then the swaging tool moves out of the tooth gap and the returning movement of shaft 62 produces upward movement of the anvil 58. Finally the clamp shoes are opened whereupon feed through another tooth pitch takes place and the operation is continued. In the described embodiment therefor, two tooth swaging operations are completed during a single rotation of the tool. It is also clear that an intermittent drive of the tool can be used. It is also clear that all the controlling and driving members are so coordinated that a correct sequence of the machine operations is obtained.

Equalization of the swaged teeth

Since the operation of a saw blade depends upon the accurate and invariable width of the saw teeth at their cutting edges, it is customary to equalize the swage or up-set of the teeth. Thus the treated teeth as shown in Fig. 13 have to be equalized to the form shown in Fig. 14. It is a particular advantage of the machine according to the present invention that it can also be used to equalize the up-set teeth without requiring any exchange of machine parts, or replacements, except the substitution of the feed pawl 32 by a different one.

The equalization procedure is shown in Figs. 9 to 12. The hereinbefore described clamp shoes 28, 29 are also formed to operate as pressing shoes for laterally treating the swaged areas of the teeth. For this purpose the shoes 28, 29 are provided with grooves 92 having the formation shown in Figs. 11 and 12. Each single groove 92 tapers downwardly, see Fig. 11, and also widens in a horizontal plane from front to back in the direction of feed of the saw blade S, as shown in Fig. 12. The set-up tooth at its cutting edge is thereby given a formation in which it tapers backwardly and downwardly from the tooth point. This lateral pressing produces a compacting of the material at the tooth point resulting in increasing hardening of the toothed edge, since it is in effect a cold working.

The equalizing is effected in a second processing of the saw blade which for this purpose, in the illustrated embodiment, is produced by a lower position of the holder strip 25, as shown in chain dotted lines in Fig. 9. The saw teeth are thus removed from the region of action of the rotating swaging tool 41 and anvil, so that apart from the feeding only the clamping and pressure shoes 28, 29 are in operation.

The feeding is produced by the special feed pawl 32' shown in Figs. 9 and 10, which engages the base of the tooth gap. Care has to be taken that the base of the tooth gap, as shown in Figure 10, lies so far under the edge h of the shoes that the feed pawl 32' can shift the swaged saw tooth sufficiently far between the shoe grooves 92 without striking against the shoes 28, 29 when it slides over the back of the next saw tooth. Since the feed determines the position of the saw tooth between the shoes 28, 29 this toothed position can be varied by regulation of the feed to produce a greater or lesser width of equalization.

Fig. 11 also shows the connection of the shoes 28, 29 to the machine frame and to the clamp lever 27, by means of screws.

When saw blades of different type than the band saw illustrated are to be treated, it is merely necessary to provide a corresponding form of holder for such saw blade.

I claim:

1. Saw blade tooth-swaging machine comprising a pair of clamping shoes between which the saw blade is clamped, an anvil associated with the clamping shoes adapted to bear against the back of the tooth up to the tooth point which is being worked, a feed device for the saw blade, a rotary swaging tool and a shaft on which the tool is mounted at one end thereof, means for mounting the tool so that it is not only rotatable but also axially movable in the machine, and a guide on which the anvil is mounted, said shaft having two oblique surfaces as control surfaces to control the movement of the anvil.

2. Saw blade tooth-swaging machine comprising a pair of clamping shoes between which the saw blade is clamped, an anvil associated with the clamping shoes adapted to bear against the back of the tooth up to the tooth point which is being worked, a feed device for the saw blade, a rotary swaging tool and a shaft on which the tool is mounted at one end thereof, means for mounting the tool so that it is not only rotatable but also axially movable in the machine, a guide on which the anvil is mounted, said shaft having two oblique surfaces as control surfaces to control the movement of the anvil, and a slide member on which the anvil is adjustable in a vertical direction and cooperating with the two oblique surfaces.

3. Saw blade tooth-swaging machine comprising a pair of clamping shoes between which the saw blade is clamped, an anvil associated with the clamping shoes adapted to bear against the back of the tooth up to the tooth point which is being worked, a feed device for the saw blade, a rotary swaging tool and a shaft on which the tool is mounted at one end thereof, means for mounting the tool so that it is not only rotatable but also axially movable in the machine, a guide on which the anvil is mounted, said shaft having two oblique surfaces as control surfaces to control the movement of the anvil, and a slide member on which the anvil is adjustable in a vertical direction and cooperating with the two oblique surfaces and having a roller on the slide member between which the oblique surfaces extend.

4. Saw blade tooth-swaging machine comprising a pair of clamping shoes between which the saw blade is clamped, an anvil associated with the clamping shoes adapted to bear against the back of the tooth up to the tooth point which is being worked, a feed device for the saw blade, a rotary swaging tool and a shaft on which the tool is mounted at one end thereof, means for mounting the tool so that it is not only rotatable but also axially movable in the machine, a cam, and a link, the link being connected to the shaft and the cam so that the latter will operate the shaft to move the latter axially.

5. Saw blade tooth-swaging machine comprising a pair of clamping shoes between which the saw blade is clamped, an anvil associated with the clamping shoes adapted to bear against the back of the tooth up to the tooth point which is being worked, a feed device for the saw blade, a rotary swaging tool and a shaft on which the tool is mounted at one end thereof, means for mounting the tool so that it is not only rotatable but also axially movable in the machine, a cam, a link, the link being connected to the shaft and the cam so that the latter will operate the shaft to move the latter axially, and a plurality of rods including an adjusting member to adapt the clamping means to saw blades of different thicknesses.

6. Saw blade tooth-swaging machine comprising a pair of clamping shoes between which the saw blade is clamped, an anvil associated with the clamping shoes adapted to bear against the back of the tooth up to the tooth point which is being worked, a feed device for the saw blade, a rotary swaging tool and a shaft on which the tool is mounted at one end thereof, and means for mounting the tool so that it is not only rotatable but also axially movable in the machine, the clamping of the saw blade by movement of the clamp shoes being effected from a gear on a shaft by means of a gear wheel with cam members and a power multiplying rod system, and the clamp shoes having recesses tapering in vertical and horizontal directions.

References Cited in the file of this patent

UNITED STATES PATENTS

| Number | Name | Date |
|---|---|---|
| 326,360 | Ward | Sept. 15, 1885 |
| 363,730 | Crossman et al. | May 24, 1887 |
| 385,290 | Williams | June 26, 1888 |
| 438,861 | Rich | Oct. 21, 1890 |
| 508,118 | Pribnow | Nov. 7, 1893 |
| 593,782 | Rawlings | Nov. 16, 1897 |
| 634,164 | Butts et al. | Oct. 3, 1899 |
| 1,173,509 | Hedstrom | Feb. 29, 1916 |
| 1,356,073 | Lambley | Oct. 19, 1920 |
| 1,382,743 | Pribnow | June 28, 1921 |
| 1,539,079 | Filstrup | May 26, 1925 |
| 1,716,241 | Raimann | June 4, 1929 |
| 2,528,925 | Vigneau | Nov. 7, 1950 |

FOREIGN PATENTS

| Number | Country | Date |
|---|---|---|
| 675,307 | France | Oct. 29, 1929 |